United States Patent [19]

Journey

[11] 4,111,063
[45] Sep. 5, 1978

[54] BELT ENRAILER AND DERAILER

[75] Inventor: John Journey, Haysville, Kans.

[73] Assignee: Thexton Manufacturing Company, Minneapolis, Minn.

[21] Appl. No.: 774,248

[22] Filed: Mar. 4, 1977

[51] Int. Cl.² .............................................. F16H 7/08
[52] U.S. Cl. ................................. 74/242.6; 74/242.7
[58] Field of Search .......................... 74/242.7, 242.6

[56] References Cited

U.S. PATENT DOCUMENTS

| | | | |
|---|---|---|---|
| 551,486 | 12/1895 | Brion, Jr. | 74/242.7 |
| 680,063 | 8/1901 | Montgomery et al. | 74/115 |
| 798,238 | 8/1905 | Volkel | 74/242.7 |
| 2,195,359 | 3/1940 | Coe et al. | 74/242.7 |
| 2,499,173 | 2/1950 | Taylor | 74/242.7 |
| 2,505,216 | 4/1950 | Simmons et al. | 74/242.7 |
| 2,615,345 | 10/1952 | Ross | 74/242.7 |
| 2,621,529 | 12/1952 | Hawkins | 74/242.7 |
| 2,924,109 | 2/1960 | Carriveau | 74/242.7 |

*Primary Examiner*—Leonard H. Gerin
*Attorney, Agent, or Firm*—H. Dale Palmatier

[57] ABSTRACT

A belt enrailing and derailing device having an elongate flexible body to conform to the shape of a V-belt groove in a pulley; the flexible body being formed of rubber to frictionally grip the side faces of the pulley at the groove, there being projections from the flexible body, one extending obliquely off to the side of the body to catch, carry and enrail the belt onto the pulley; and the other projection providing a camming action to carry the belt off to the side of the pulley in a derailing operation.

11 Claims, 6 Drawing Figures

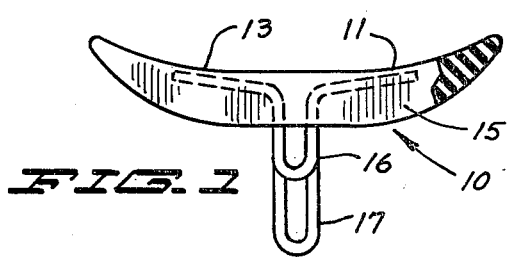
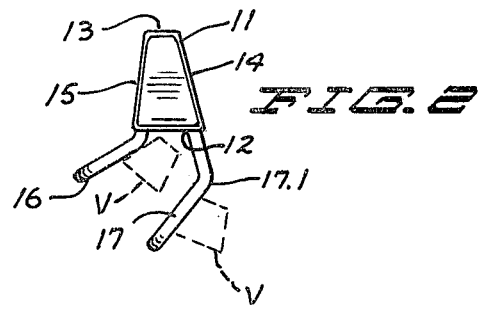
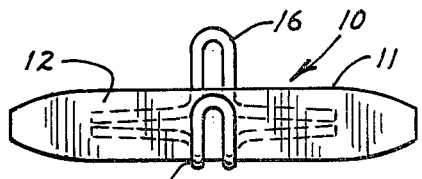
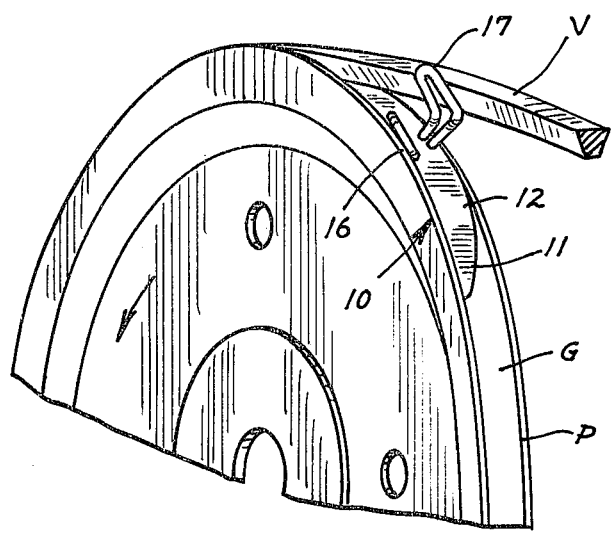
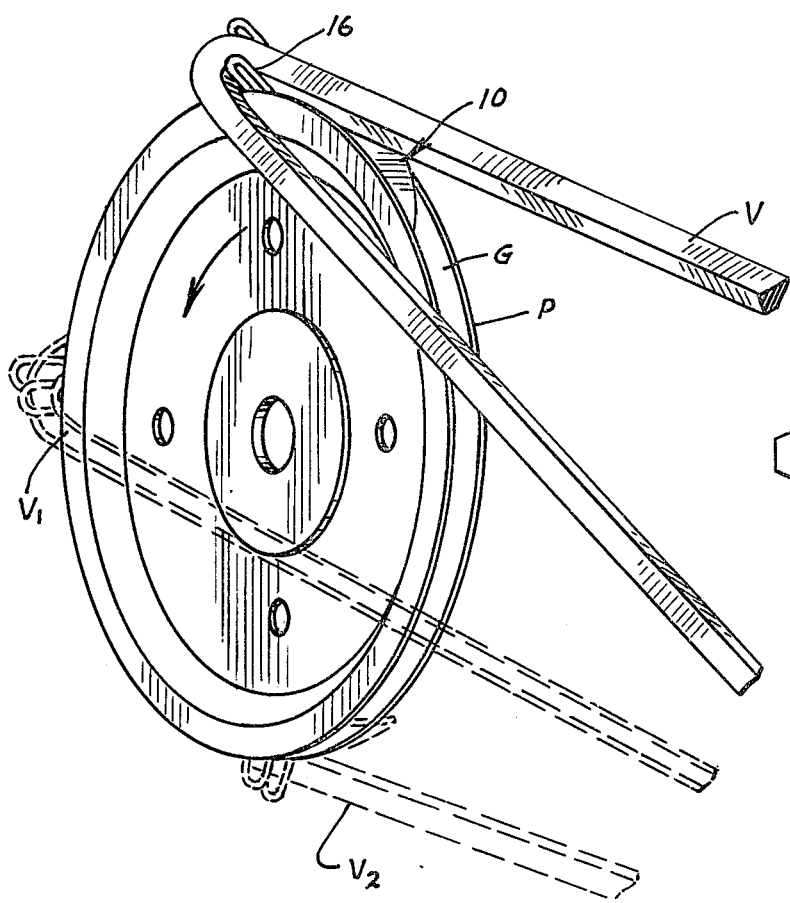
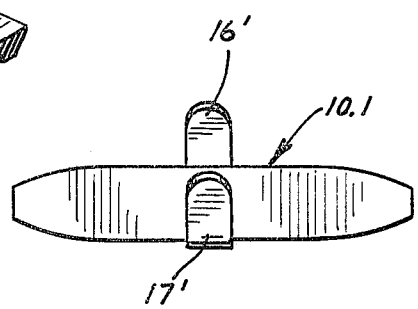

BELT ENRAILER AND DERAILER

This invention relates to V-belt enrailers and derailers, and more specifically relates to such devices which are to be used in cramped spaces such as in connection with automobile engines.

As more and more accessory equipment is driven by an automobile engine, the spaces under the hood of an automobile have become substantially more cramped and cluttered, and, instead of there being merely one V-belt utilized, most automobiles have two or more V-belts which are used to drive auxiliary or accessory equipment. Such V-belts must be removed from and applied to drive pulleys frequently as a part of routine engine and machine or accessory servicing.

The application and removal of belts in relation to pulleys has existed since the beginning of power driven machinery. In some instances, attachments were temporarily or permanently affixed to the pulleys to make it easier to apply or remove belts. See U.S. Pat. Nos. 551,486 and 680,063, and 798,238, all of which relate to handling flat belts. Similar apparatus affixed to the pulley is illustrated in U.S. Pat. No. 2,499,173 for handling V-belts. An arcuately shaped appliance to fit in the groove of a V-belt and to be dropped out as it completes a single revolution around the pulley is illustrated in U.S. Pat. No. 2,195,359.

Oftentimes mechanics will simply use a screw driver or other similar type of shop tool to force a V-belt onto or off from a pulley. In addition, other generally similar hand tools with handles have been devised for manipulating V-belts in relation to their pulleys. See U.S. Pat. Nos. 2,505,216; 2,615,345; and 2,621,529. These hand-held tools present substantial difficulties in their use in cramped quarters, and present safety hazards as well because it is extremely risky to handhold a tool for manipulating a belt if power is applied to the pulley from the engine or through the belt itself.

SUMMARY OF THE INVENTION

The present invention accomplishes both enrailing and derailing of a V-belt relative to an appropriate pulley. The device is relatively small and is lacking protrusions of disproportionate size so that the device may be used with pulleys in cramped quarters. The device is applicable to belts of various size because of its inherent flexibility and further, the construction of the body of the device which is principally of rubber, facilitates use of this tool without any form of clamping connection to the pulley and handholding of the device is not necessary either.

BRIEF DESCRIPTION OF THE DRAWINGS

FIG. 1 is a side elevation view of the belt enrailing and derailing device;

FIG. 2 is an end elevation view thereof;

FIG. 3 is a bottom plan view thereof;

FIG. 4 is a perspective view, showing in multiple positions, the steps of enrailing a belt onto a pulley through the use of the present invention;

FIG. 5 is a detail perspective view illustrating of use of the present invention in derailing a belt from a pulley;

FIG. 6 is a bottom plan view of a modified form of the invention.

DETAILED DESCRIPTION OF THE INVENTION

In the form of the invention illustrated in FIGS. 1-5, the V-belt enrailing and derailing device is indicated in general by numeral 10 and includes an elongate and stiff but yieldably flexible body 11, preferably molded of a relatively stiff and tough rubber or elastomeric material. The elongate body has an outer side 12 and an inner side 13 to lie in the bottom of the groove G of a pulley P. The outer side 12 of the body will ordinarily lie substantially level with the peripheral edges of the pulley P adjacent the groove. The elongate body 11 also has substantially flat side faces 14 and 15 which are obliquely oriented with respect to each other and which converge toward each other and toward the inner side 13 so as to assume the approximate shape of a V-belt V as illustrated in FIGS. 4 and 5.

The elongate body 11 has a pair of rigid projections 16 and 17 extending outwardly from the outer side 12 thereof. The projections 16 and 17 are, in the form illustrated in FIGS. 1-5, formed of rigid rod-like material, preferably of steel, and the projections 16 and 17 have their inner end portions embedded in the body 11 so as to be carried in substantially rigid relation in the body. It will be noted that both of the rigid projections 16 and 17 extend generally transversely outwardly from the outer side 12, and extend in generally the same direction. The projection 16 extends transversely off to the side and in oblique relation to the side face 15 of the body 11 so as to extend, when the elongate body is applied to a pulley P, off to the side of the pulley. Accordingly, the rigid projection 16 is particularly useful in catching or reaching transversely of the pulley P to engage and carry the belt around the pulley when the belt is being enrailed.

The rigid projection 17, which is somewhat longer than the projection 16, is positioned in substantially superposed relation with the outer side 12 of the body 11 without extending significantly outwardly to either side of the side faces 14 and 15. The projection 17 does have a characteristic "dog-leg" shape, the bend 17.1 of which is disposed slightly off to the transverse side of the body 11 so that the projection 17 will cause the belt V to be guided, by camming, off to the side of the pulley as the pulley is rotated.

It is particularly important as relates to the present invention that the body 11 is formed of an elastomeric material such as rubber so as to be flexible and to accommodate itself to the particular peripheral configuration of the pulley P, so that this device 10 can be used in enrailing and derailing belts to pulleys of many different sizes. The pulley may be as small as 2 to 3 inches, or may be as large as 10 to 12 inches or larger, and in any of these general size ranges, the inner side 13 will lie at the bottom of the groove of the pulley and the side faces 14 and 15 will lie flush against the sides of the groove in the pulley so that the projections 16 and 17 are held in substantially prefixed orientation with respect to the pulley and the belt being enrailed or derailed. During the enrailing of a belt V to a pulley as illustrated in FIG. 4, the device 10 is inserted into the groove G of the pulley and the belt V is applied over the projection 16 of the device. As previously indicated, the side faces 14 and 15 will lie flush against the sides of the groove of the pulley, and, as a result, the projection 16 is held in a predetermined position with respect to the side of the pulley.

Preferably, the device 10 is manually pushed along the groove G until the top run of the belt V is fairly tight, and at this time the belt urges the body 11 downwardly into the groove with a considerable amount of force, causing a very tight friction relationship to be created between the body 11 and the pulley P. When this condition has been established, the device 10 will be retained in the particular position illustrated.

The mechanic may then entirely remove his hands from the pulley and device 10 so that power may be obtained from the automobile engine or other power source so that the pulley P will be turned. The frictional relationship which has already been established will carry the belt around the pulley as the pulley is rotated, first to the position $V_1$ illustrated in FIG. 4, and ultimately to the position $V_2$ illustrated in FIG. 4.

Depending upon the size of the pulley and the looseness of the belt V when it is applied to the pulley, the belt may be pulled around the pulley to various degrees by the manual pushing of the device 10 around the groove G in the pulley. However, it is emphasized that when the body 11 has reached the ultimate position in the groove G from which the device 10 can no longer be moved manually in the groove, the device 10 will be held very tightly in the groove and application of a slight amount of power from the power source so as to rotate the pulley will cause the belt to be carried around and enrailed into the groove. When the device 10 has traveled around to the position $V_2$ as illustrated in FIG. 4, the device will, in many instances, be carried away from the pulley with the belt as the belt emerges from the groove.

In other instances, the device 10 may separate itself from the belt at the location where the belt emerges from the pulley P, in which case the device 10 may simply fall free or the mechanic may stop the pulley at this location and pick the device 10 off the pulley.

In derailing the belt V from the pulley as illustrated in FIG. 5, the body 11 is inserted into the groove G with the projection 17 bearing outwardly against the belt V. The mechanic will manually push the device around the pulley until the belt V bears very firmly against the projection 17. At this time, the orientation of the projection 17 tends to move the belt V slightly off to the side of the pulley. As a slight amount of power is applied to the pulley or belt, so as to incrementally rotate the pulley P, the frictional relationship already set up between the body 11 and the sidewall of the groove in the pulley causes the device 10 to be carried further around the pulley as the pulley revolves. As this occurs, the belt V is progressively moved further off to the side of the pulley and will be entirely derailed as the pulley revolves through approximately half a rotation from the position illustrated in FIG. 5.

In the form of the device indicated by numeral 10.1 in FIG. 6, it will be noted that the projections 16' and 17' are shaped substantially the same as illustrated in FIGS. 1, 2 and 3, except that in FIG. 6 these projections are formed of a rigid bar-shaped material and, as in FIGS. 1-3, are formed of very rigid, preferably steel material. Operation of this form of the enrailer and derailer is substantially the same as previously described.

It will be seen that I have provided a new and improved enrailing and derailing apparatus for manipulating V-belts with respect to their grooved pulleys. The body of the device is formed of flexible material, preferably rubber, and it may conform to the shape of many different sizes of pulleys. The elastomeric or rubber material very tightly and frictionally grips the sidewalls of the groove of the pulley so that when the device is moved into the groove and beneath the belt in the groove, the mechanic may remove his hand from the pulley without any fear of being injured when power is applied to turn the pulley to complete the enrailing or derailing process. The device is reversible and may be used in connection with pulleys turning in clockwise or counterclockwise directions; and may enrail the belt from either side of the pulleys and may derail the belt to either side of the pulley.

What is claimed is:

1. A V-belt enrailer and derailer for use with a grooved pulley, comprising
   an elongate body to lie in the pulley groove and extend along a portion of the pulley periphery, the body having an outer side to lie adjacent the outer peripheral edge of the pulley when the body lies in the pulley groove;
   a substantially rigid projection affixed to the body in substantially fixed relation, said projection extending transversely of the elongate body and outwardly from said outer side thereof for engaging and guiding a V-belt transversely of the pulley groove as the pulley is rotated, and
   the elongate body being formed of stiff but flexible material so as to conform to the peripheral contour of the pulley and frictionally adhere against slipping to the pulley surfaces in response to minimal pressure applied from the belt toward the pulley.

2. The enrailer and derailer according to claim 1 and said elongate body being formed of rubber.

3. The enrailer and derailer according to claim 1 and the elongate body having an inner side opposite said outer side, to lie in the bottom of the pulley groove, and the body also having elongate and substantially flat faces oriented transversely of said inner and outer sides and oriented in opposite transverse directions relative to each other to bear against the opposite sides of the pulley groove and restrain tipping of the projection transversely of the body and pulley groove.

4. The enrailer and derailer according to claim 3 and said faces being oriented obliquely of each other in a direction transversely of the body and convergently toward the inner side of the body.

5. The enrailer and derailer according to claim 3 and the projection extending distinctly away from one of said flat faces and also extending into proximity with and transversely beyond the other of said flat faces and at an oblique obtuse angle thereto to engage and carry the belt at the side of the pulley.

6. The enrailer and derailer according to claim 3 and the projection having a slanted side oriented obliquely of the outer side of the elongate body and obliquely of at least one of said flat sides, a portion of said slanted side being located in superposed position relative to the outer side of the elongate body and facing away from the elongate body to guide the belt transversely of and toward the side of the pulley groove in which the elongate body lies.

7. A V-belt enrailer and derailer for use with a grooved pulley, comprising
   an elongate and stiff but flexible body to lie in the pulley groove and extend along a portion of the pulley periphery, the body having an inner side to lie along the bottom of the pulley groove and also having an outer side opposite said inner side, to lie adjacent the outer peripheral edge of the pulley when the body lies in and flexes to conform to the contour of the pulley groove, the elongate body also having elongate and substantially flat faces oriented in opposite transverse directions relative to each other and extending longitudinally along the elongate bottom and between the inner and outer sides thereof to bear against the opposite sides of the pulley groove and maintain the elongate body in predetermined orientation with respect to the pulley, a first and a second elongate rigid projection, both affixed to the flexible body in substantially fixed relation and both extending transversely of the elongate body and outwardly from the outer side thereof for engaging and guiding V-belts transversely of the pulley groove as the pulley is rotated, said first projection extending distinctly away from one of said flat faces and also extending into proximity with and transversely beyond the other of said flat faces and at an oblique obtuse angle thereto to engage and carry the belt at the side of the pulley, said second rigid projection being spaced apart from the first rigid projection by a distance not less than the approximate width of the elongate body, and said second projection having a slanted side oriented obliquely of the outer side of the elongate body and obliquely of at least one of said flat faces, a portion of said slanted side being located in superposed position relative to the outer sides of the elongate body and facing away from the elongate body to guide the belt transversely of and toward the side of the pulley groove in which the elongate body lies and rotates.

8. The enrailer and derailer according to claim 7 and both of the rigid projections extending generally outwardly from the outer side of the body and obliquely thereof in substantially the same direction.

9. The enrailer and derailer according to claim 3 and said projection being formed of rigid rod-like material.

10. The enrailer and derailer according to claim 3 and said projection being constructed of flat bar stock.

11. A V-belt enrailer and derailer for use with a grooved pulley, comprising:

an elongate and stiff but flexible body of elastomeric material to lie in the pulley groove and extend along a portion of the pulley periphery, the body having an inner side to be disposed adjacent the bottom of the pulley groove, and also having an outer side to lie adjacent the outer peripheral edge of the pulley when the body lies in the pulley groove, said flexible body also having substantially flat side faces oriented in opposite directions and converging toward said inner side to lie flush against the pulley at the sides of the pulley groove, and a pair of substantially rigid belt-guiding projections affixed to the flexible body, said projections extending transversely outwardly from the outer side of the elongate body and being located intermediate the ends of said body for engaging and guiding a V-belt transversely of the pulley groove as the pulley is rotated, one of said projections extending from the body transversely outwardly in oblique relation to the adjacent side face and also in oblique relation to said outer side of the body whereby said projection extends transversely outwardly from the side of the pulley when the elongate body is carried in the pulley groove thereof in order to pick up and carry the belt in an enrailing operation around the pulley when rotated, the other of the projections being located in generally superposed relation to the outer side of the elongate body and extending obliquely of said outer side of the body in substantially the same direction as said first mentioned projection to engage and guide the belt transversely away from the pulley in a derailing operation.

* * * * *